United States Patent [19]
Ting

[11] Patent Number: 6,053,095
[45] Date of Patent: Apr. 25, 2000

[54] STEAMING POT

[76] Inventor: Wen-Ping Ting, No. 69, Cheng-I Road, Jen-I Tsun, Jen-Te Hsiang, Tainan Hsien, Taiwan

[21] Appl. No.: 09/422,958

[22] Filed: Oct. 22, 1999

[51] Int. Cl.$^7$ ........................................... A47J 37/00
[52] U.S. Cl. ................................ 99/346; 99/347; 99/426; 99/450
[58] Field of Search ............................. 99/339, 340, 341, 99/345–347, 352, 355, 402, 426, 448, 450, 516, 534–536; 426/509–511, 523, 438, 439

[56] References Cited

U.S. PATENT DOCUMENTS

| | | | |
|---|---|---|---|
| 1,349,302 | 8/1920 | Spitz | 99/346 |
| 1,700,614 | 1/1929 | Moore | 99/346 |
| 2,142,800 | 1/1939 | Olexsy | 99/346 |
| 2,343,156 | 2/1944 | Penick | 99/346 |
| 2,350,623 | 6/1944 | Kruea | 99/419 |
| 2,400,405 | 5/1946 | Getgey et al. | 99/346 |
| 2,560,605 | 7/1951 | Shell | 99/346 |
| 2,724,323 | 11/1955 | Hemminger et al. | 99/299 |
| 3,053,166 | 9/1962 | Ashley | 99/346 |
| 3,412,673 | 11/1968 | Landis | 99/346 |
| 3,922,960 | 12/1975 | Lewis | 99/345 X |
| 4,732,137 | 3/1988 | Parsons | 99/347 X |
| 5,421,254 | 6/1995 | McDonald | 99/346 |

*Primary Examiner*—Timothy Simone

[57] ABSTRACT

A steaming pot includes a pot body, a food plate, a net, a spray plate, and a cap. The food plate has two guide tubes vertical located to guide steam mixed with seasonings or condiments put on the bottom of the pot body, onto the spray plate. Then steam with seasonings flows along guide plates evenly onto the spray plates, and through many spray holes of the spray plate down onto food on the food plate in a balanced condition so that seasonings may infiltrate into the food in a balanced condition with its outer surface remaining intact owing to no contact of the food with the seasonings.

3 Claims, 8 Drawing Sheets

STEAMING POT

BACKGROUND OF THE INVENTION

This invention relates to a steaming pot, particularly to one spraying seasonings or condiments evenly on a chicken or a duck to be steamed, with the outer surface intact, with seasonings or condiments evenly infiltrating in the food, and having a good taste after steamed.

A conventional steaming pot as shown in FIG. 1, includes a pot body 10, a cap 11, a food net 12, and two grips 100, 110 fixed on two sides of the pot body 10 and the cap 11.

In cooking, a meat such as a chicken, a duck, etc., as shown in FIG. 2, and a seasoning or a condiment liquid is placed on the bottom of the pot body 10, and the food net 12 is placed on the bottom of the pot body, with the food placed on the food net 12. Then the cap 11 is placed on the pot body 10, which is placed in an oven for steaming the food. Thus the seasoning or the condiment liquid B is heated to produce steam to rise up and infiltrate into the food A. Practically, the food A is placed just on the seasoning liquid, with the bottom of the food being very near to the seasoning liquid B. Then the bottom and the upper portion of the food A are heated in different degree, permitting the upper portion not enough steamed and the bottom over steamed. And the seasoning could not infiltrate evenly in the food A, with some portion tasted over seasoned and some portion tasted seasoned too light. In addition, chances are that the outer surface of the food A is oversteamed to split open, impossible to keep wholeness of the food A, with taste not ideal.

SUMMARY OF THE INVENTION

This invention has been devised to offer a steam pot possible to let circulating steam spraying on a food evenly to let it keep the outer surface intact, and taste good.

The feature of the invention is a pot body having a food plate resting in the pot body for placing food such as a chicken or a duck, etc, and seasoning placed on the bottom of the pot body, and two guide tubes formed at two sides of the food plate for steam mixed seasoning to flow through up onto a spray plate fixed on the guide tubes and above the food plate and through many spray holes of the spray plate down onto the food for seasoning to infiltrate into the food to let it taste good.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
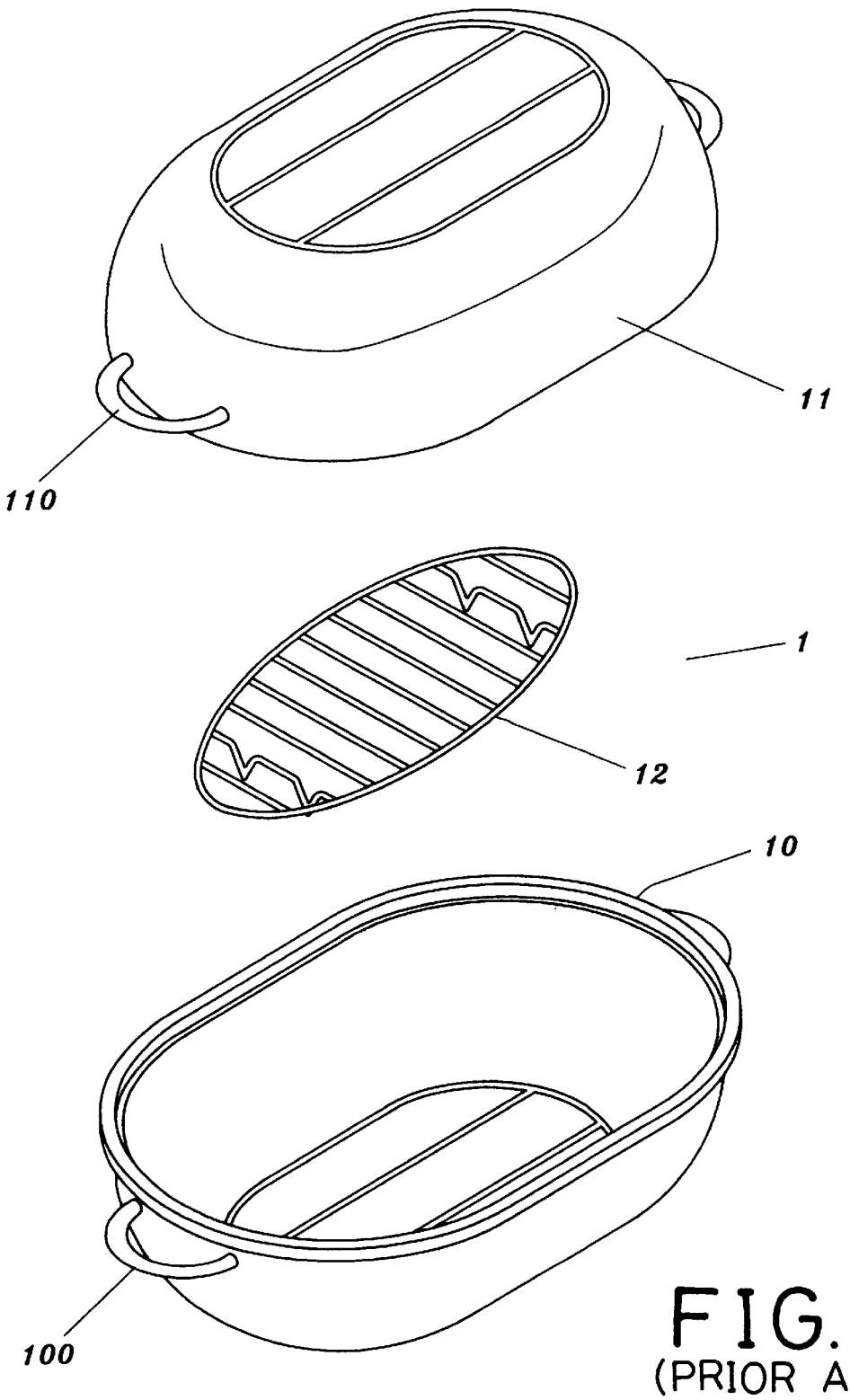
FIG. 1 is an exploded perspective view of a conventional known steaming pot.
Figure 2:
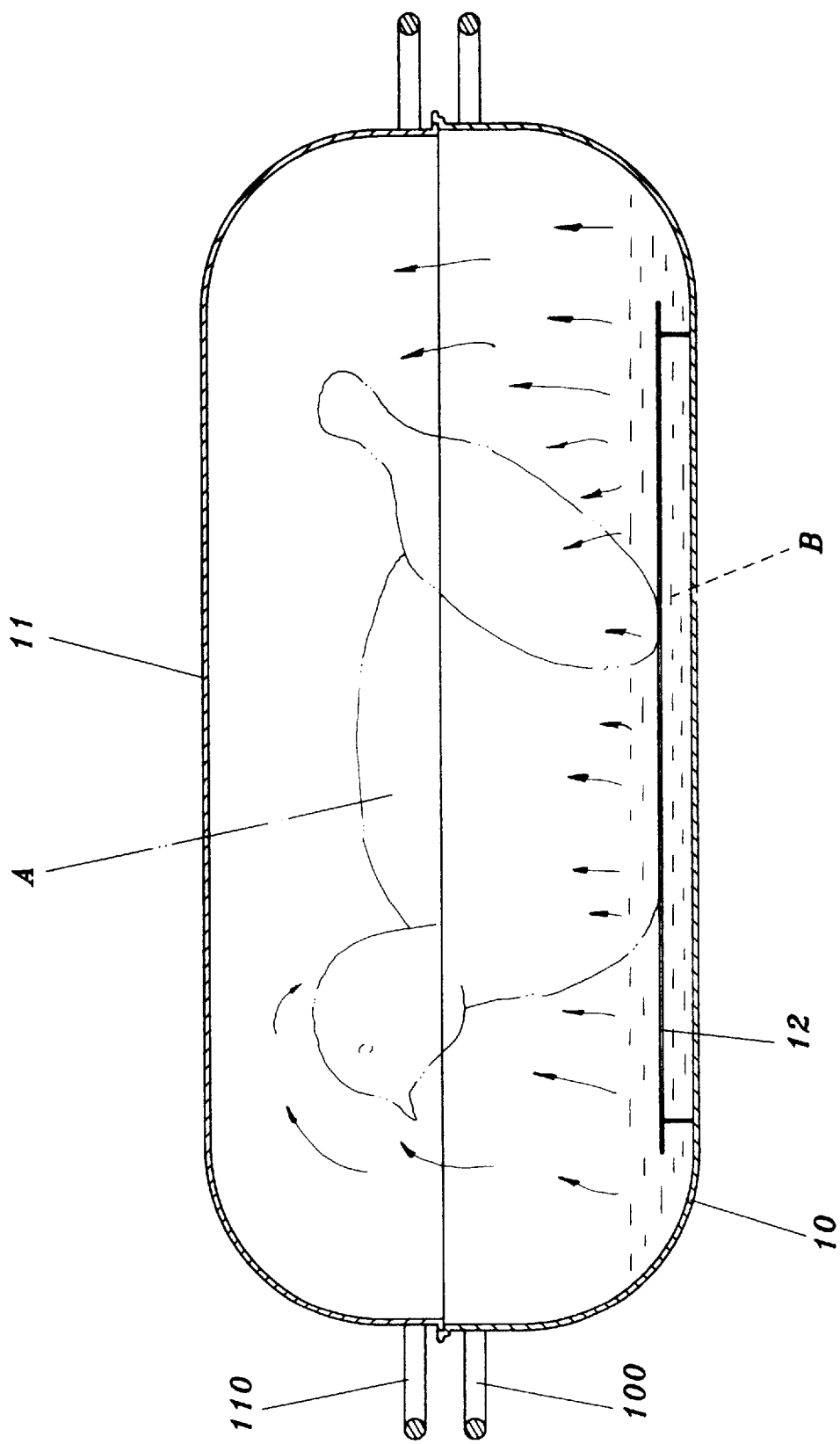
FIG. 2 is a cross-sectional view of the known conventional known steaming pot.

A preferred embodiment of a steaming pot in the present invention, as shown in FIG. includes a pot body 2, a food disc 3, a net 4, a spray plate 5, and a cap 6 as main components combined together.

The pot body 2 has two tabs 20 with a threaded hole 200 on the bottom, an annular projecting edge 21 formed in an inner intermediate surface, a fitting circumferential edge 22 formed in an upper end, and a grip 23 respectively fixed at two outer sides.

Figure 3:
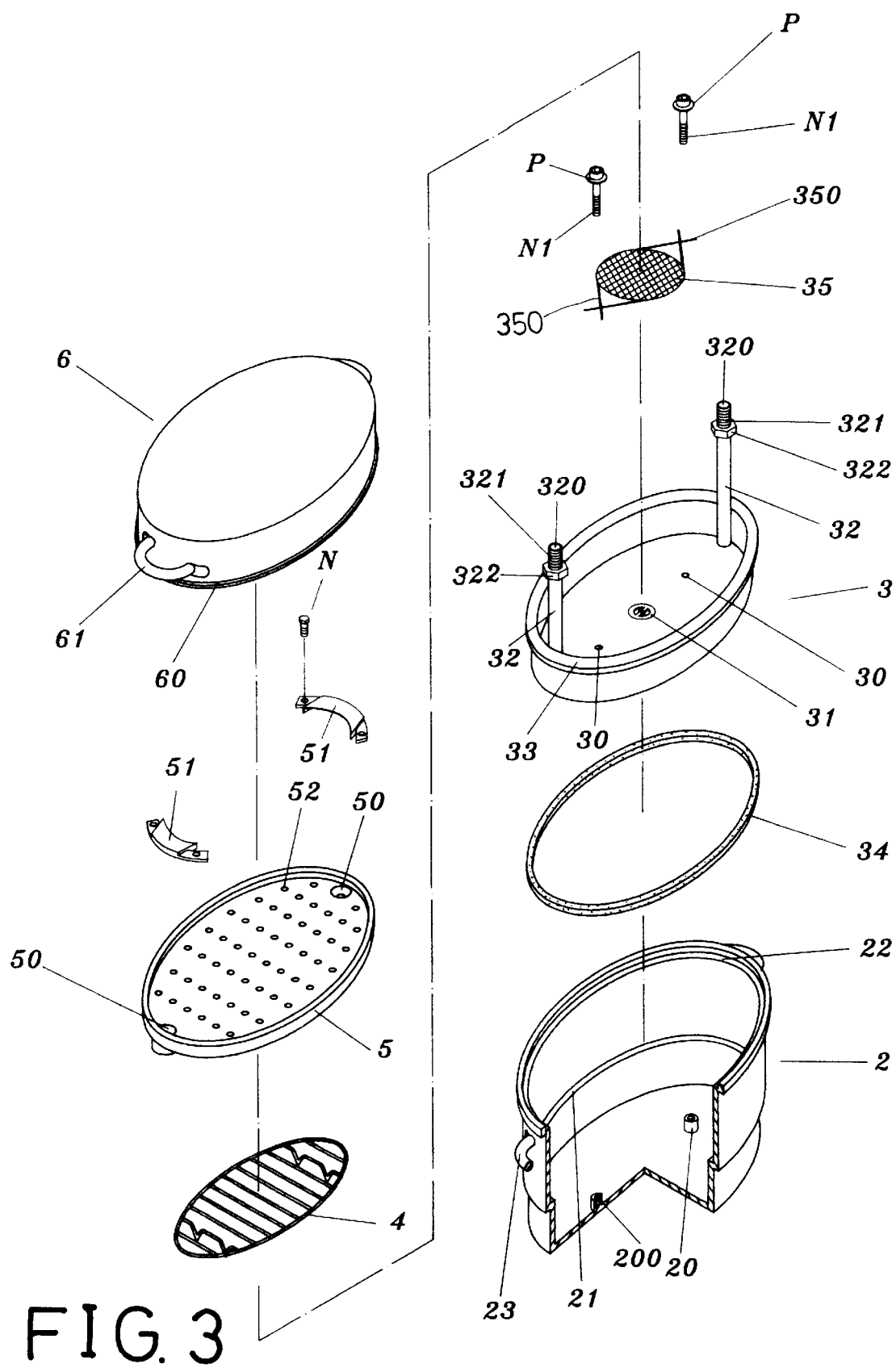
FIG. 3 is an exploded perspective view of a steaming pot in the present invention.
Figure 4:
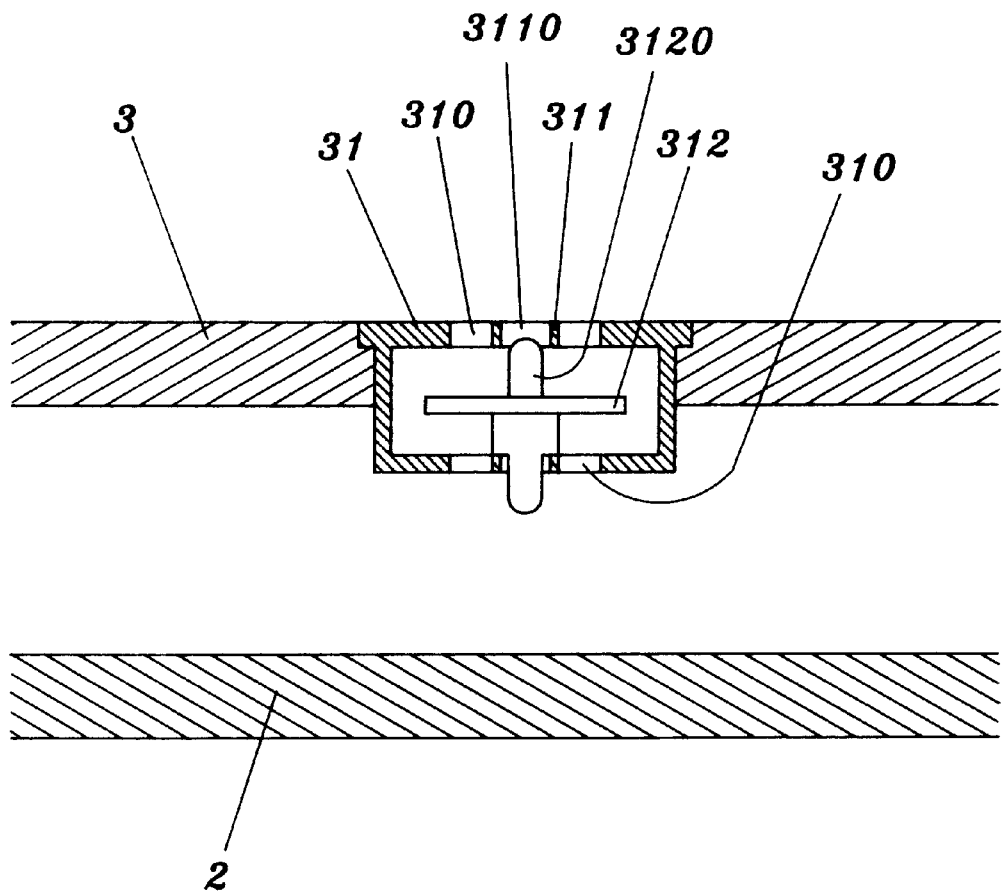
FIG. 4 is a cross-sectional view of an anti-leak valve in the present invention.

The food disc 3 is placed in the pot body 2, having two holes 30 corresponding to the two tabs 20 of the pot body 2, an anti-leak valve 31 fixed in the center of the bottom as shown in FIGS. 3 and 4. The anti-leak valve 31 has a round center hole 310 each in an upper side and a lower side, a position member 311 with a center hole 3110 put in the round center hole 310, a horizontal anti-leak plate 312 located in the space between the upper and the lower side and having a position rod 3120 respectively on and under the plate 312 to fit in the position hole 3110 of the position member 311. Further, a guide tube 32 is positioned respectively at two sides of the food disc 3, having a center through hole 320, male threads 321 formed in an upper end and screwed with an adjusting nut 322. Further, the food disc 3 has a flange 33 formed in an upper end, and a filter net 35 placed on the anti-leak valve 31, with a cross rod 350 respectively formed at two sides.

The net 4 is placed on the good disc 3.

The spraying plate 5 is fixed on the two guide tubes 32 of the food disc 3, having two seasoning inlets 50 at two ends of the bottom, and a guide plate 51 respectively connected to each inlet 50, and many spray holes 52 bored spaced around.

The cap 6 closes on the pot body 2, having a flange 61 formed at a lower end, and a grip 61 each fixed at two sides.

Figure 5:
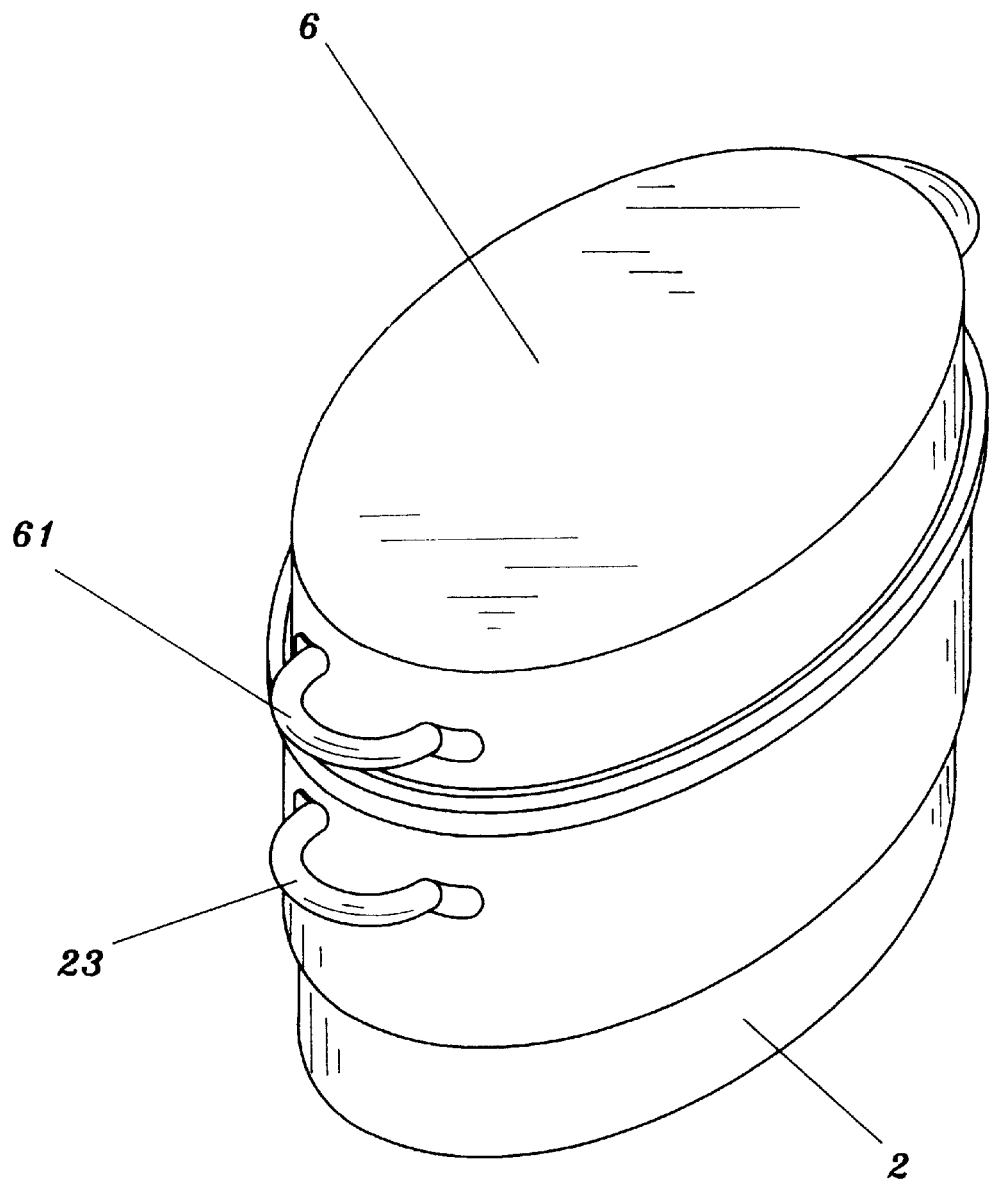
FIG. 5 is a perspective view of the steaming pot in the present invention.
Figure 6:
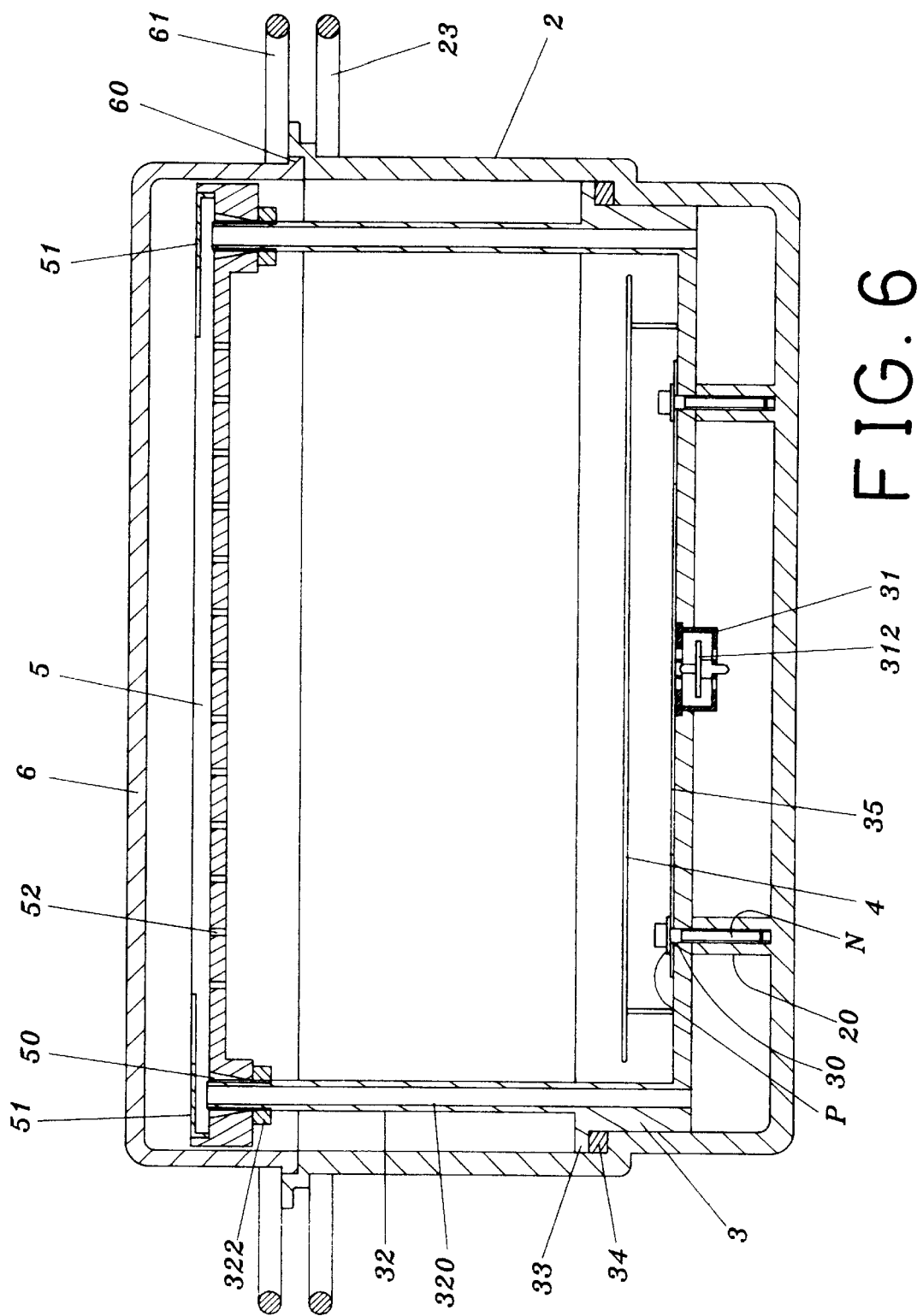
FIG. 6 is a cross-sectional view of the steaming pot in the present invention.

In assembling, referring to FIGS. 3, 5 and 6, firstly the anti-leak ring 34 is fitted under the flange 33 of the food disc 3, which is then placed in the pot body 2, letting the flange 33 and the anti-leak ring 34 rest on the inner projection edge 21 of the pot body 2. At the same time, the two holes 30 of the food disc 3 are aligned to the threaded holes 200 of the tabs 20. Then the filter net 35 is placed on the anti-leak valve 31, and bolts N are screwed through two sides of the filter net 35, through two holes 30 of the food disc 3 and with the threaded holes 200, fixing the filter net on the food disc 3 with washers P, and also fixing the food disc 3 in the pot body 2. Next, the spray plate 5 with the guide plates 51 screwed together is fixed on the two guide tubes 32, letting the upper ends of the guide tubes 32 insert in the inlet holes 50. Finally the cap 6 is closed on the pot body 2, finishing assemblage of the steaming pot.

Figure 7:
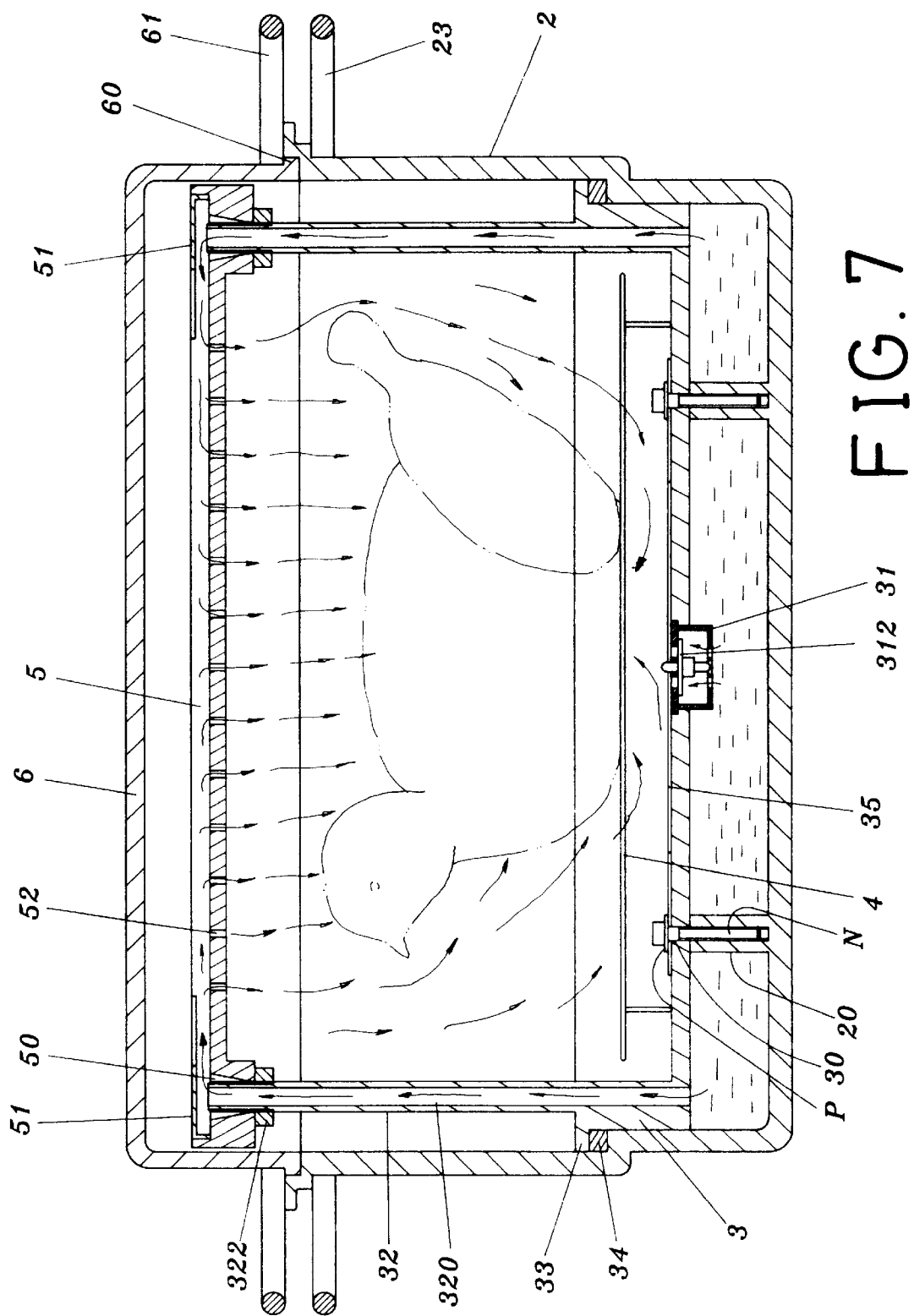
FIG. 7 is a cross-sectional view of the steaming pot being in use in the present invention.
Figure 8:
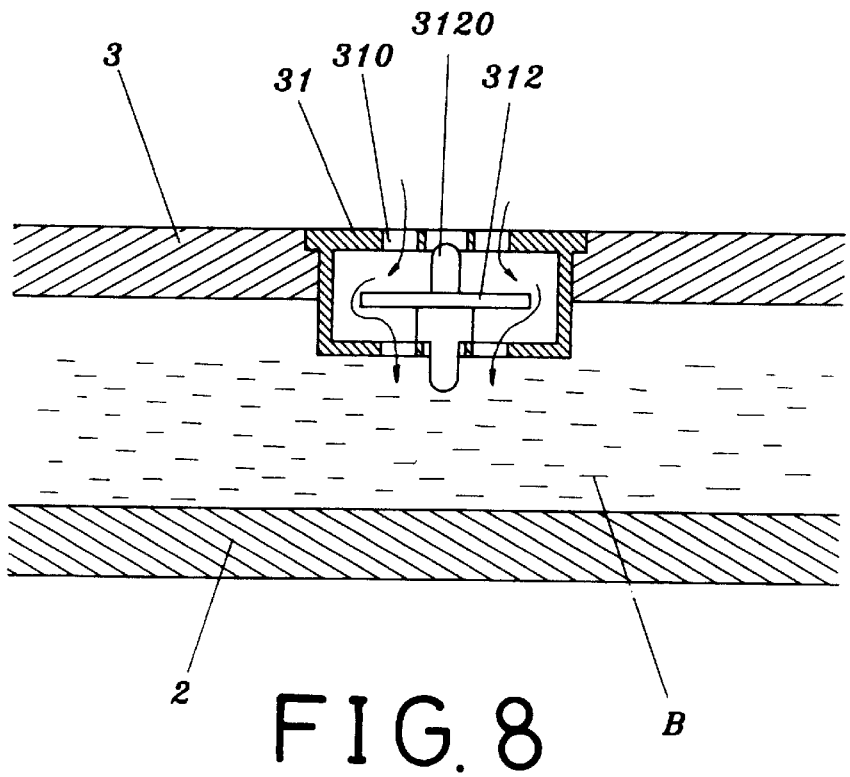
FIG. 8 is a cross-sectional view of the anti-leak valve being in open condition for seasoning liquid to flow down through in the present invention; and, FIG. 9 is a cross-sectional view of the anti-leak valve being in closed condition to stop seasoning liquid to pass through up in the present invention.
Figure 9:
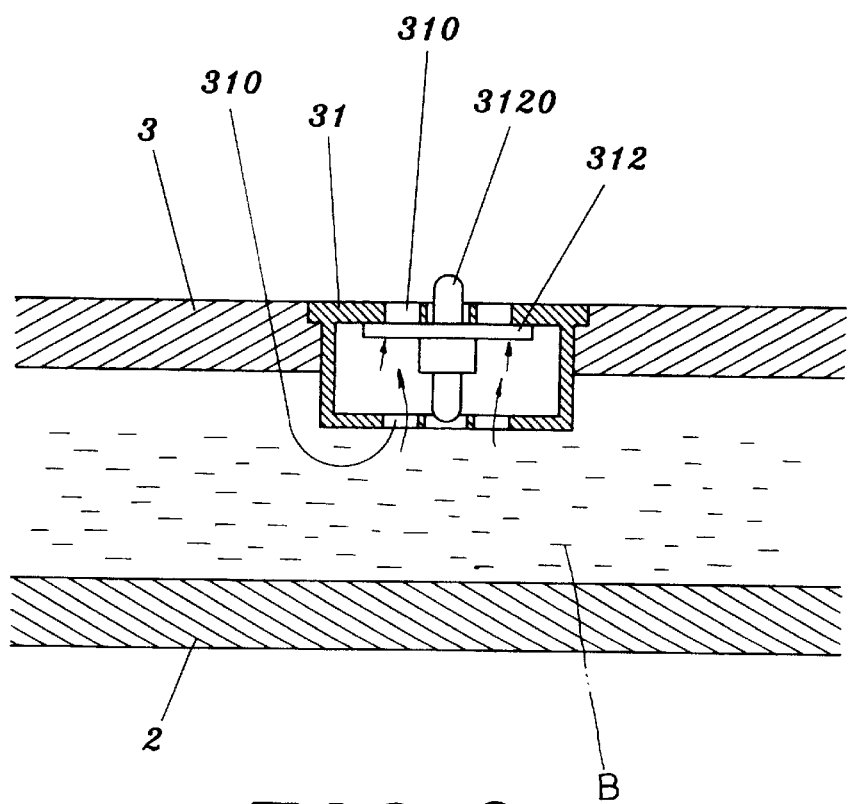

In using, referring to FIGS. 6 and 7, seasonings or condiments B prepared is placed in the pot body 2, the food disc 3 is placed in the pot body 2, the net 4 is placed on the food disc 3. Then meat food A such as a chicken or a duck, etc. is put on the food plate 4, with the spray plate 5 put on the two guide tubes 32, and with the cap 6 closed on the pot body 2. Then the pot body 2 is sent into an oven for steaming. During steaming process, the heat of the oven boils the seasonings B to produce steam mixed with the seasonings. Then the steam cannot flow up along the walls of the pot body 2 hampered by the food disc 3 and the anti-leak ring 34, but flows only through the two guide holes 320 of the guide tubes 32, and guided by the two guide plates 51 of the spray plate 5 to the tipper space of the spray plates to spray down through the many spray holes 52 evenly onto the outer surface of the food A. In such a way, the steam fixed with the seasonings circulates around and spray on the food for steaming it well cooked with the surface of the food kept intact, owing to no direct contact of the food with the seasoning. Therefore, a circulating spraying steaming mode is ensured in the steaming pot in the invention, and in addition, the filter net 35 on the anti-leak valve 31 filters miscellaneous matters produced in steaming process, preventing them from falling into and blocking the anti-leak valve 31.

The steaming pot in the invention has the following advantages, as can be understood from the aforesaid description.

1. The circulating spraying mode can make meat food receive spray evenly, with seasonings or condiments infiltrating completely into the food to taste good.

2. Food and seasonings are not in direct contact, preventing food from overcooked or unbalanced infiltration of seasonings, or splitting of the outer surface.

While the preferred embodiment of the invention has been described above, it will be recognized and understood that various modifications may be made therein and the appended claims are intended to cover all such modifications which may fall within the spirit and scope of the invention.

What is claimed is:

1. A steaming pot comprising:

a pot body having two tabs with a threaded hole formed in an inner bottom, an annular projection edge formed in an inner circumferential surface, an annular insert edge formed in an upper end, and two grips formed at two sides;

a food plate placed in said pot body, having two holes corresponding to said two threaded holes of said tabs of said pot body, a anti-leak valve fixed in a center portion, two guiding tubes vertically formed at two sides and having a through guide hole and male threaded formed in an upper end and screwed with an adjusting nut, a flange formed in an upper end and resting on said annular projecting edge of said pot body, and an anti-leak ring fitted around a lower circumferential end;

a net placed on said food plate;

a spray plate placed on said two guide tubes of said food plate, an inlet respectively formed at two sides, a guide plate respectively fixed on said inlet, and many spray holes spaced around;

a cap closed on said pot body, having a flange formed in a lower circumferential edge and two grips fixed at two sides; and, in cooking, seasonings or condiments prepared placed on the bottom of said pot body and guided to flow with steam through said two guide tubes up and then flowing down through said many spray holes of said spray plate, spraying on food placed on said food plate, thus said food receiving balanced steam with said seasonings infiltrating evenly into said food with its outer surface intact and taste well.

2. The steaming pot as claimed in claim 1, wherein said anti-leak valve has a round hole formed in an upper side and a lower side, a position member fitted in each said round hole and having a center position hole, a anti-leak disc deposited in a space between said upper and said lower side and having a position post extending up and down to move to fit in said upper or said lower position holes of said position member to seal said upper hole or said lower hole of said position member.

3. The steaming pot as claimed in claim 1, wherein a filter net is additionally placed on said anti-leak valve for preventing miscellaneous matters from falling into said anti-leak valve to block said anti-leak valve.

* * * * *